H. I. MARTIN.
ADJUSTABLE RUNNER FOR BABY CARRIAGES.
APPLICATION FILED JAN. 22, 1910.
967,405.
Patented Aug. 16, 1910.
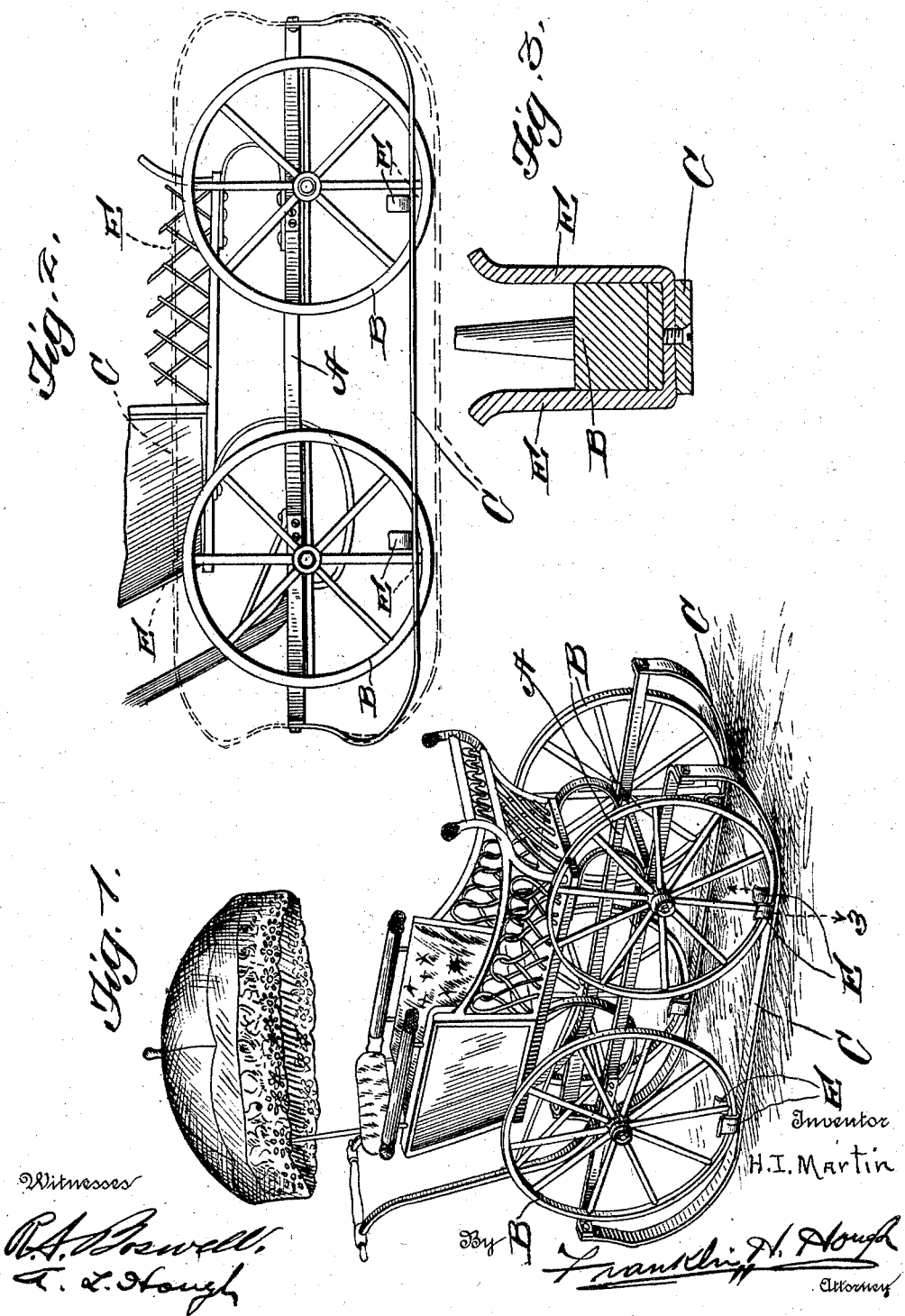

UNITED STATES PATENT OFFICE.

HENRY I. MARTIN, OF FRANKLIN, NEW HAMPSHIRE.

ADJUSTABLE RUNNER FOR BABY-CARRIAGES.

967,405.  Specification of Letters Patent.  Patented Aug. 16, 1910.

Application filed January 22, 1910. Serial No. 539,507.

*To all whom it may concern:*

Be it known that I, HENRY I. MARTIN, a citizen of the United States, residing at Franklin, in the county of Merrimack and State of New Hampshire, have invented certain new and useful Improvements in Adjustable Runners for Baby - Carriages; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in adjustable runners for baby carriages and consists in a simple and efficient device of this nature which may be pivotally connected to the frame of a carriage and adapted to swing to position to be engaged by the wheels when adapted for use or above the wheels when not in use.

The invention comprises various details of construction and combinations and arrangements of parts which will be hereinafter fully described and then specifically defined in the appended claim.

I illustrate my invention in the accompanying drawings, in which:—

Figure 1 is a side elevation showing the application of my invention to a carriage and in position for use. Fig 2 is a similar view showing the runners swung to an inoperative position and folded back, and Fig. 3 is a cross sectional view on line 3—3 of Fig. 1.

Reference now being had to the details of drawings by letter, A designates the frame of a baby carriage having the wheels B journaled upon axles in the usual manner, and C designates a runner which has its ends bowed as shown and pivotally mounted upon the pins or bolts carried by the frame. Said runner is provided with oppositely disposed lugs E which are adapted to engage the opposite sides of the rims of the wheels in the manner shown in Fig. 1 of the drawings to hold the latter upon the runner when the device is adjusted for use. Said runner, there being one attached to each side of the carriage, is made preferably of a resilient metal so that it may be sprung underneath the wheels and held by the natural resiliency of the runner in contact with the tread surfaces of the wheels. When it is desired to swing the runner to an inoperative position, as shown in Fig. 2 of the drawings, the runner may be sprung downward to assume the position shown in dotted lines in Fig. 1, after which the lugs upon the runner will be free from the wheels, thus allowing said runner to be swung to the position shown in Fig. 2.

What I claim to be new is:—

In combination with the frame of a carriage having two parallel bars, axles upon which the same are supported, the ends of said bars being bent at right angles and extending outwardly in opposite directions, wheels upon said axles intermediate the angled ends of the bars, resilient runners pivotally connected to the angled ends of said bars and flat upon their faces and adapted to be held by their resiliency against the tires and wheels, and clips fastened to the upper faces of the runners and adapted to hold the wheels upon the runners, as set forth.

In testimony whereof I hereunto affix my signature in the presence of two witnesses.

HENRY I. MARTIN.

Witnesses:
 PEARLE E. WILSON,
 W. E. SMITH.